(12) United States Patent
Connolly et al.

(10) Patent No.: US 10,013,283 B1
(45) Date of Patent: Jul. 3, 2018

(54) METHODS AND APPARATUS FOR DATA REQUEST SCHEDULING IN PERFORMING PARALLEL IO OPERATIONS

(71) Applicant: DataCore Software Corporation, Fort Lauderdale, FL (US)

(72) Inventors: Nicholas C. Connolly, Purley (GB); Robert Bassett, Pensacola, FL (US); Ziya Aral, Pompano Beach, FL (US); Roni J. Putra, Pompano Beach, FL (US)

(73) Assignee: DataCore Software Corporation, Fort Lauderdale, FL (US)

( * ) Notice: Subject to any disclaimer, the term of this patent is extended or adjusted under 35 U.S.C. 154(b) by 31 days.

(21) Appl. No.: 15/236,902

(22) Filed: Aug. 15, 2016

(51) Int. Cl.
*G06F 12/00* (2006.01)
*G06F 9/48* (2006.01)
*G06F 12/0888* (2016.01)
*G06F 3/06* (2006.01)

(52) U.S. Cl.
CPC .......... *G06F 9/4881* (2013.01); *G06F 3/0619* (2013.01); *G06F 3/0665* (2013.01); *G06F 3/0689* (2013.01); *G06F 12/0888* (2013.01); *G06F 2212/6046* (2013.01)

(58) Field of Classification Search
CPC .... G06F 9/4881; G06F 3/0619; G06F 3/0665; G06F 3/0689; G06F 12/0888; G06F 2212/6046
See application file for complete search history.

(56) References Cited

U.S. PATENT DOCUMENTS

2006/0282689 A1\* 12/2006 Tipley ................... G06F 1/3203
713/300

\* cited by examiner

*Primary Examiner* — Shawn X Gu
(74) *Attorney, Agent, or Firm* — Michael Best & Friedrich LLP

(57) ABSTRACT

Methods and apparatus for data request scheduling in performing parallel IO operations are disclosed. In one example, IO requests directed to an operating system having an IO scheduling component are processed. There, an IO request directed from an application to the operating system is intercepted. A determination is made whether the IO request is subject to immediate processing using available parallel processing resources. When it is determined that the IO request is subject to immediate processing using the available parallel processing resources, the IO scheduling component of the operating system is bypassed. The IO request is directly and immediately processed and passed back to the application using the available parallel processing resources.

18 Claims, 9 Drawing Sheets

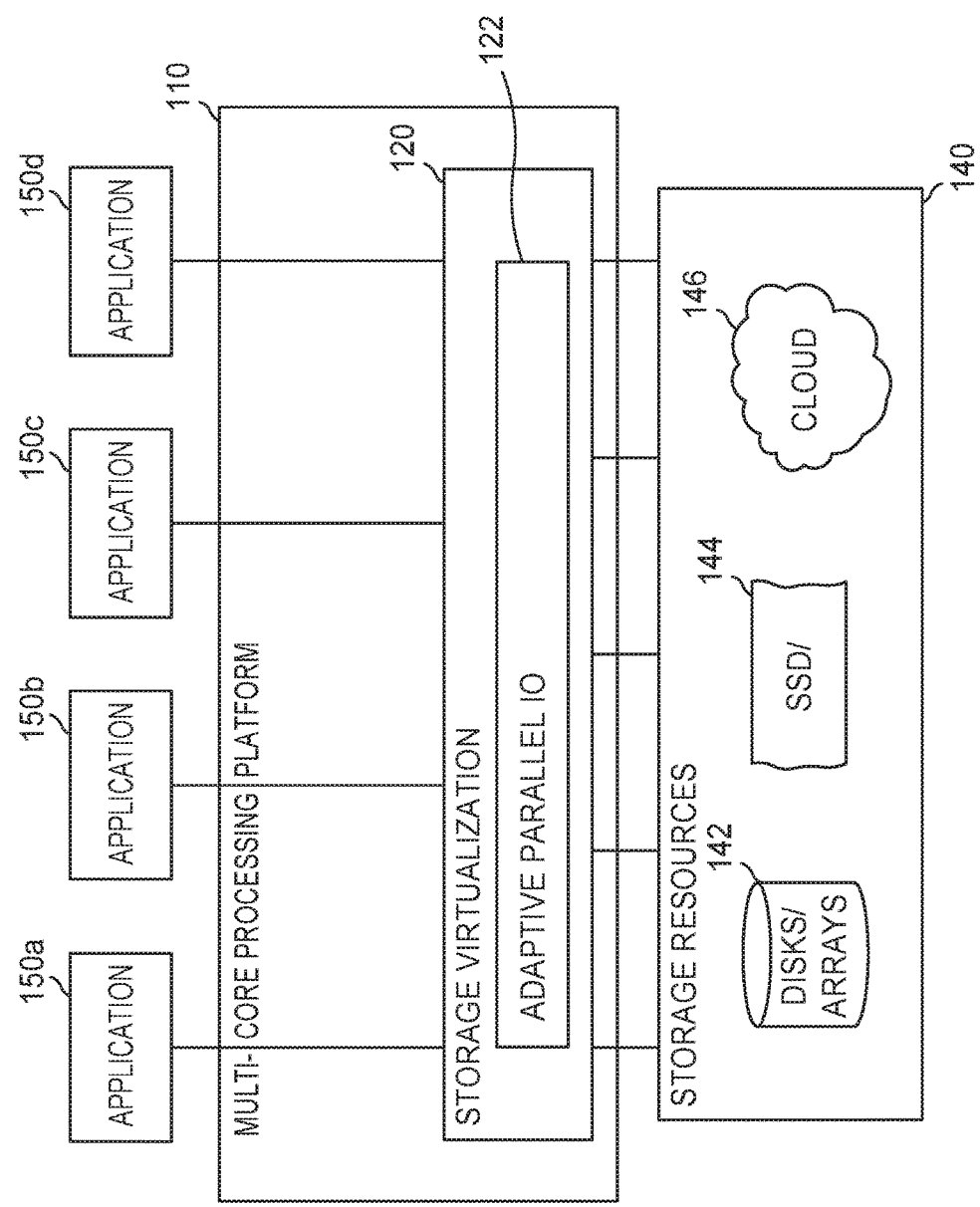

METHODS AND APPARATUS FOR DATA REQUEST SCHEDULING IN PERFORMING PARALLEL IO OPERATIONS

BACKGROUND OF THE INVENTION

Field of the Invention

This invention relates generally to storage virtualization and more particularly to performing IO operations in parallel.

Description of the Related Art

What is needed is storage virtualization that performs IO operations in parallel, in particular in a multi-core processing environment.

SUMMARY OF THE INVENTION

Methods and apparatus for data request scheduling in performing parallel IO operations are disclosed. In one example, IO requests directed to an operating system having an IO scheduling component are processed. There, an IO request directed from an application to the operating system is intercepted. A determination is made whether the IO request is subject to immediate processing using available parallel processing resources. When it is determined that the IO request is subject to immediate processing using the available parallel processing resources, the IO scheduling component of the operating system is bypassed. The IO request is directly and immediately processed and passed back to the application using the available parallel processing resources, without having to go back to the IO scheduling component of the operating system.

In one example, a storage virtualization component on the parallel processing platform presents virtual volumes and manages a disk block cache that is used to satisfy IO requests. A query is made with reference to the disk block cache, and the response to that is used to determine whether the IO request is subject to immediate processing. For example, where the IO request is a read request and the query indicates a cache hit, or where the IO request is a write request and there is current capacity to handle the write request (e.g., in a write buffer), then it is determined that the IO request is subject to immediate processing. The IO request is immediately satisfied for the requesting application without having to invoke the IO scheduling component of the operating system. Also, parallel processing resources (e.g., as many CPUs as desired) can be used to process the IO requests in parallel.

In another example, determining whether the IO request is subject to immediate processing comprises an adaptive determination of the available parallel processing resources.

Adaptive determination of the available parallel processing resources may entail determining a threshold number of processors for IO request processing, and determining that the IO request is subject to immediate processing where the currently used number of processors for IO processing is below the threshold number.

It may also entail identifying a quality of service promised to an application originating the IO request, and determining that the IO request is subject to immediate processing depending upon the quality of service promised to the application.

Historical and instantaneous demand for IO request processing, as balanced against the same for application (task) processing is also used to adaptively invoke parallel processing resources to complete IO requests.

Finally, heuristics are employed to determine whether IO requests are subject to immediate processing depending upon any or all of the type of IO request, threshold number(s) of processors for IO request processing, quality of service promised to application(s) originating the IO requests, and demand levels.

BRIEF DESCRIPTION OF THE DRAWINGS

These and other more detailed and specific features of the present invention are more fully disclosed in the following specification, reference being had to the accompanying drawings, in which:

FIGS. 1A-B are block diagrams illustrating systems with storage virtualization with adaptive parallel IO.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1A:
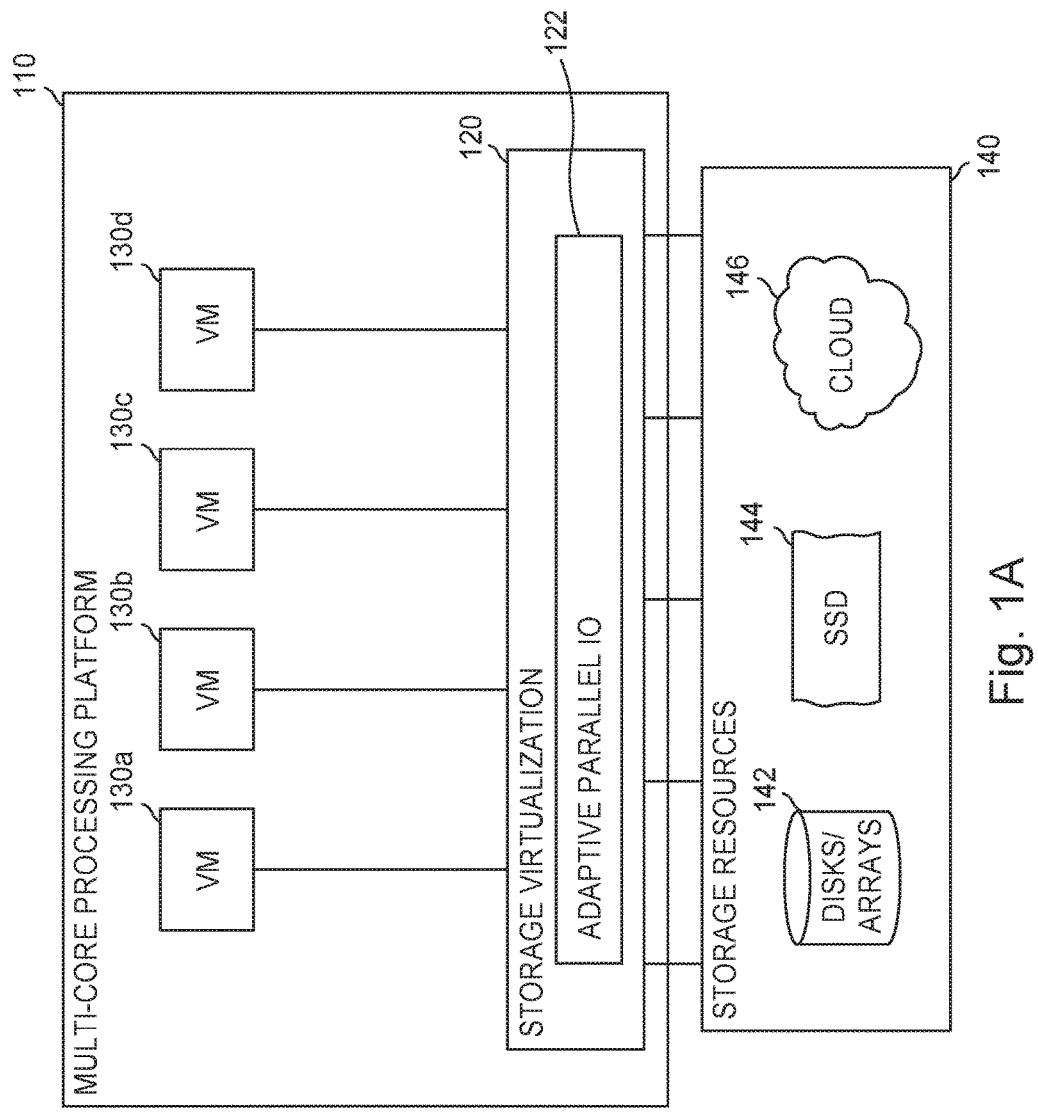

FIG. 1A is a block diagram illustrating a multi-core processing platform 110 configured to include a storage virtualization (SV) component 120 with an adaptive parallel IO (APIO) component 122. The multi-core processing platform 110 includes multiple cores (CPUs) that are configured to execute tasks in parallel. The SV component 120 provides traditional features such as the presentation of virtual disks to any number of virtual machines (VM 130a-d). The VMs 130a-d respectively direct 10 requests to the presented virtual disks. The SV component 120 responds to these requests and manages underlying storage resources 140. The SV component 120 also provides a variety of conventional storage management facilities in relation to the presented virtual disks, including disk snapshots, disk mirroring, caching, etc.

The SV component 120 is configured to present the virtual disks to the VMs 130a-d, and to respond to those requests in a fashion that allows the respective VMs 130a-d to merely "see" and interact with the disks, while the SV component 120 handles all of the underlying organization and management of storage operations and the corresponding management of the storage resources 140.

Multi-core processing is well known, and it is known to distribute processing tasks among respective CPUs. However, storage operations have continued to essentially operate serially. Even where multiple cores are available to execute storage operations, to ostensibly provide parallel processing, there remains a significant bottleneck in that storage operations are received and processed serially. That is, an IO handler typically processes all of the incoming IO requests from various requestors, and then sequences them accordingly. Even if the IO requests are distributed out among multiple CPUs, the organization and performance of the IO within the operating system is still undertaken in essentially serial form. Problematic delay-causing IO requests are simply embedded among the tasked cores, so a variety of IO processing log jams remain present.

In one aspect, the embodiments described herein accommodate actual usage of the efficiencies of multicore architectures by changing the way IO scheduling is performed to maximize parallelism on a multicore platform. This, along with emulating block storage devices using software and RAM creates the opportunity to complete most I/O requests in microseconds.

The APIO component 122 is configured to enable the execution of numerous IO request streams simultaneously in parallel among multiple CPUs. The APIO component 122 also adaptively invokes available CPUs into the IO request stream processing to dynamically make use of any available processing resources. Still further, the APIO component 122 filters IO requests so that immediately serviceable IO operations are processed in parallel, while (less frequent) delay-causing IO operations are forwarded for ordinary IO sequencing. Due to caching features in the SV component 120, the delay-causing IO operations are relatively small in number, so the APIO component 122 provides very significant increases in overall performance by allowing all of the other, relatively fast IO operations (i.e., the vast majority of IO operations) to essentially execute synchronously in parallel.

The adaptive parallel IO processing of the APIO component 122 is not limited to environments with virtual machines (or applications) co-resident on the multi-core processing platform. FIG. 1B illustrates an example where the APIO component 122 remains resident on the multi-core processing platform 110, but respective applications 150*a-d* reside elsewhere.

Figure 2A:
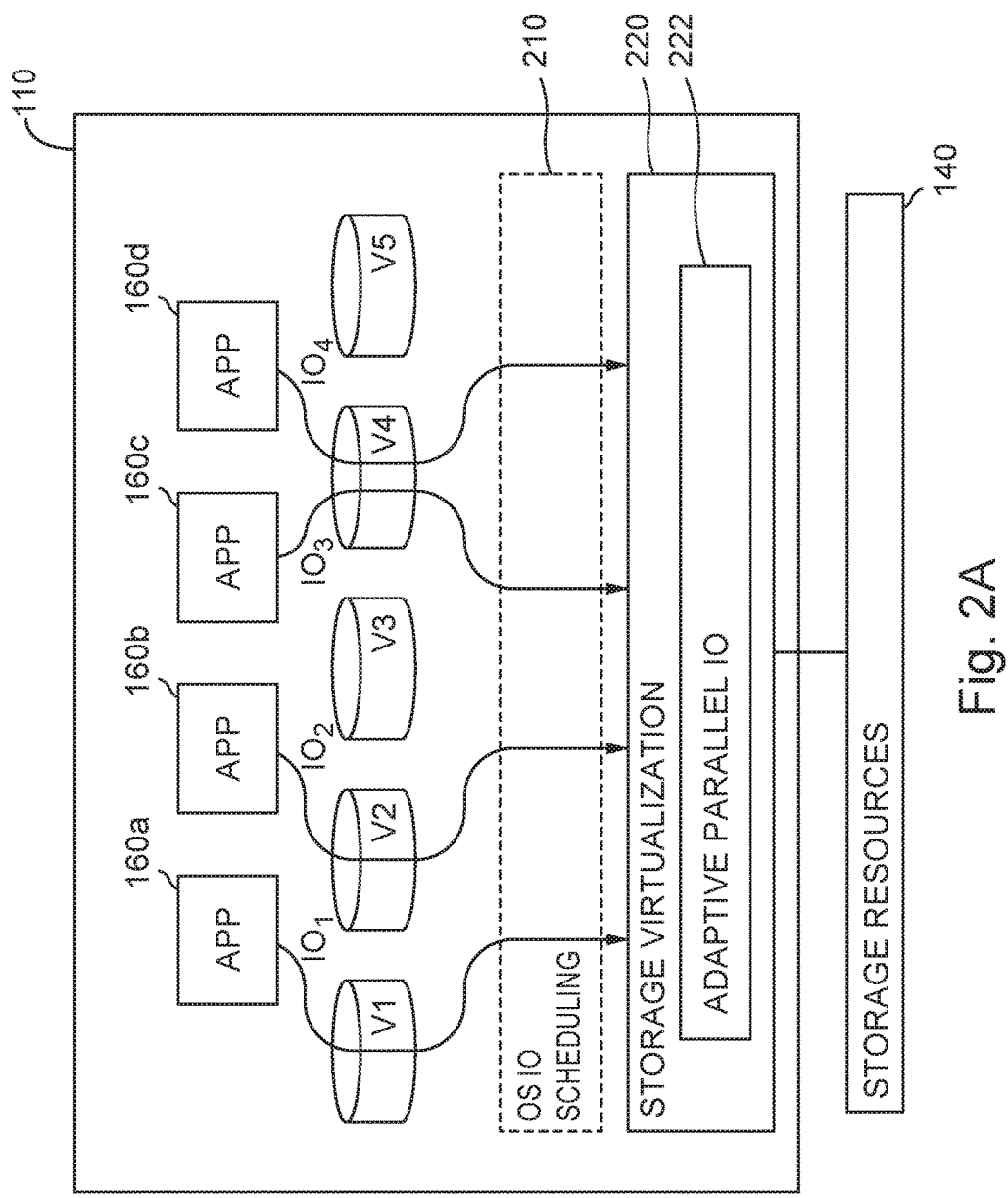
FIG. 2A-B are block diagrams illustrating an example of storage virtualization with adaptive parallel IO.

FIG. 2A is a block diagram illustrating an example of storage virtualization with an SV component 220 equipped to perform parallel bypass. In parallel bypass, IO requests are handled directly on application threads (e.g., IO-IO4). As mentioned above, the SV component 220 presents virtual disks V1-V4 to various applications 150*a-d*. For example, a first application 160*a* may be presented a virtual disk V1, and may direct an IO request to that virtual disk V1 accordingly. An IO request may be a read or write operation, but may also be a command.

Similarly, additional threads IO2-4 respectively correspond to other applications 160*b-d*. As evident from the figures, there is not necessarily a one-to-one correlation of applications to virtual disks. Thus two applications 160*c-d* may both be presented with a given virtual disk V4 and may direct IO requests accordingly.

In a conventional approach, IO requests are passed to an OS IO scheduling component, which receives and sequences IO requests while the applications wait for them to be completed and returned. Specifically, an application makes an IO request and receives an acknowledgement through the OS that the IO request is pending. Meanwhile, the OS IO scheduling component queues the IO request in a different context. The IO request then progresses through the sequence of IO requests for processing. Ultimately, the IO request is completed, and a callback is made to the application to indicate completion of the IO request (e.g., in the original context to the application). This kind of loopback approach is repeatedly performed for each IO request. And in a parallel environment, the problem is exacerbated.

By contrast, the APIO component 222 receives the indication of IO requests before they hit the OS IO scheduling component. The APIO component 222 first receives the IO requests and determines whether the OS IO scheduling component can be bypassed. For example, the IO scheduling component bypassing may be provided in the event of a read that is a cache hit, or any write operation. It may also be provided based upon the availability of parallel processing resources, which in turn can be determined by the number of available CPUs, QOS determinations, and/or respective demand levels for IO requests and application task/function processing.

Figure 2B:
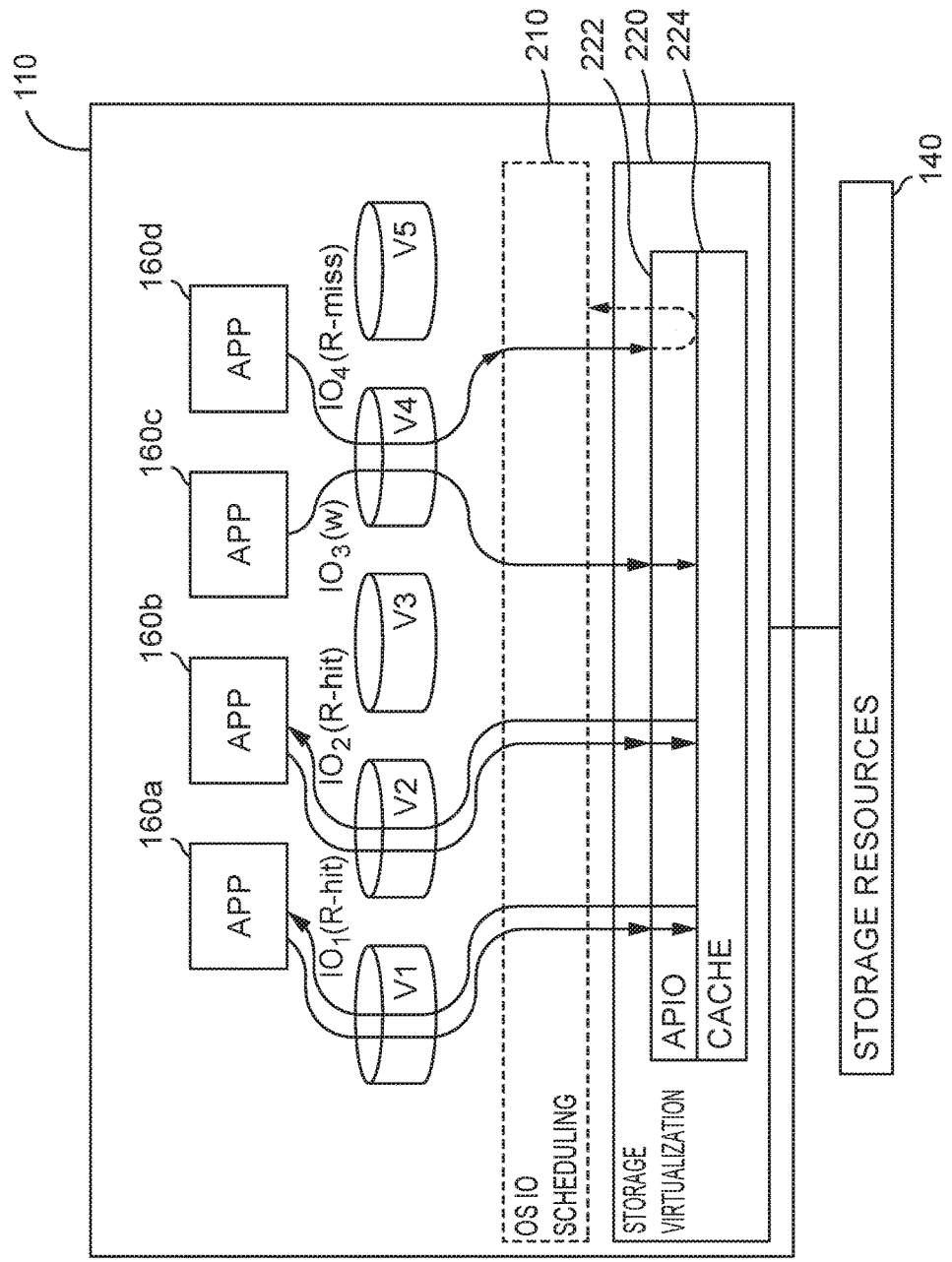

FIG. 2B illustrates the SV component 220 to include a disk block cache. It also illustrates various examples of threads IO1-IO4. By way of example, in the event of a read that is a cache hit (thread IO1 or IO2), the IO request is intercepted, the OS IO sequencing component is not invoked, and the read can be returned directly to the application without incurring a context change. In the event of a write operation, the write is immediately acknowledged to the application as successful, again with no OS IO sequencing and no context change. The write can be "dumped" into the SV component 220, which reconciles the actual writing of the data to storage resources 140 (and tracking for intervening reads). If desired, if a write queue starts to become overloaded, the OS IO sequencing component can be invoked to allow the write queue to be processed. Alternatively, additional parallel processing resources (e.g., more CPUs) can be invoked to handle times of high IO request demand. Essentially, the write therefore processes with the efficiency of a read cache hit. Finally, a cache miss (thread t4) may be cycled back to OS IO scheduling 210. But even on a cache miss, the cache is updated to reflect the more recent read operation, expediting subsequent reads to that data. And still further, if desired and available, additional resources may also be used to handle a cache miss without having to loop back to the OS IO scheduling component. As such, the vast majority of IO requests are immediately processed and returned to the application successfully, without the context change or other delays typically introduced by OS IO scheduling 210.

With the APIO component 222, the processing of IO requests is as though the application threads have their data directly attached to them. The requests are directly completed with function calls, without queueing, and without loopbacks and corresponding context switching. This avoids thrashing between IO scheduling threads and application threads and significantly improves the processing of IO requests in a multi-core environment.

Figure 3:
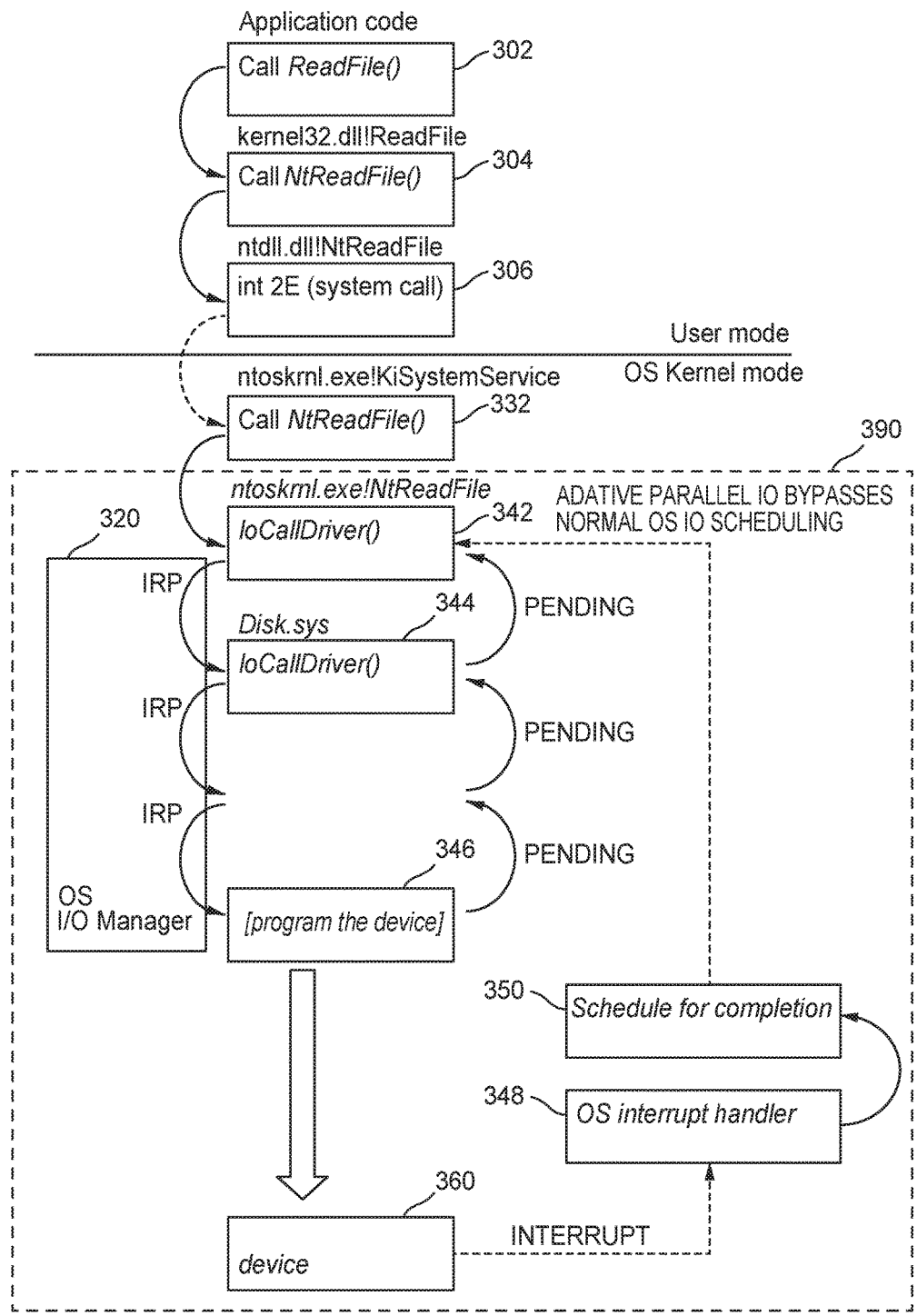
FIG. 3 is a block and flow diagram illustrating an example of OS IO scheduling that is bypassed in storage virtualization with adaptive parallel IO.

FIG. 3 is a block and flow diagram illustrating an example 300 of aspects of OS IO scheduling 390 that are bypassed using the SV component having an APIO component. Although one example of an OS is a Windows operating system, adaptive parallel IO as described herein is applicable to any OS.

It is useful to consider how a disk read operation is normally handled to appreciate how the APIO component avoids various latencies.

Any application may initiate an application thread in connection with an IO request, such as a read request (e.g., Call ReadFile( ) (302)). Following this, the application code transfers to the Win32 API NtReadFile (304). The application thread transfers to another Windows API, where it executes a system trap instruction (306).

The application thread then switches to kernel mode, so that it can execute in the trusted areas of the operating system normally sequestered from running applications. The trap handler sends the application thread to another NtReadFile in the kernel (332). At this stage, involvement of the Windows I/O Manager 320 for IO scheduling initiates. The IO scheduling that would normally be performed by the OS IO scheduling component is generally indicated by the dotted box 390 in FIG. 3. An initial aspect of this is that the app thread builds an I/O Request Packet (IRP), sets it up to target a disk object, and then carries it into the I/O Manager 320 (342).

In normal OS IO scheduling, by weaving in and out of the I/O Manager 320, the app thread carries the IRP down a series of layered drivers (e.g., 342, 344, 346, and so on). This "downward" progression continues until a bottom level driver (e.g., 346) determines that it is time to program an actual device 360 to get the data. The app thread executes driver code to program the device 360 (shown as downward arrow). Notably, in a traditional arrangement, because storage responsiveness would be expected to be relatively long (e.g., millions of CPU cycles), the driver code sets up a callback and sends the app thread back up the stack of drivers to indicate a pending status. This theoretically would allow the operating system to execute millions of CPU cycles on application work, rather than busy-waiting until the storage operation completes.

In normal IO scheduling the app thread would weave its way back up to the NtReadFile (332) of the kernel, where it either goes to sleep, or goes back into the application to do other work. Assuming that it goes to sleep, the application thread is removed from the CPU, and another thread is put on that CPU. At this point, the cached application thread state is lost from that CPU. This is part of what is referred to as context switch.

Continuing with the explanation of typical normal IO scheduling, it may be millions of CPU cycles later before the disk has completed the request. The disk device interrupts the system, which causes further shuffling as the operating system holds existing processing and sets up to handle the interrupt (348). In yet another context, the interrupt is handled and the operating system prepares to notify the original application thread that its request is complete. The interrupt handler schedules the callback to be prioritized and the interrupt is dismissed. The operating system would then execute the deferred procedure call, which gets the requested data arranged and calls back to the application thread (350).

At this point, the application thread is awakened by the operating system, and scheduled on a CPU (maybe the same one it was originally on, or maybe another one). The application thread finishes running back up the layers until it gets back to the next instruction after the original call to Win32 ReadFile.

Thus, typical aspects of OS IO scheduling 390 introduce significant processing delays. According to one aspect of this disclosure, the SV component with an APIO component intercepts any IO requests and largely circumvents the participation of the delay-inducing aspects of OS IO scheduling 390 entirely.

The above description illustrates how even in a single thread, the OS IO scheduling 390 introduces a bottleneck. In a parallel environment, the delays are multiplied. Moreover, the repeated involvement of OS IO scheduling 390 prevents storage operation processing from participating in the potential advantages of a multi-core environment.

Figure 4:
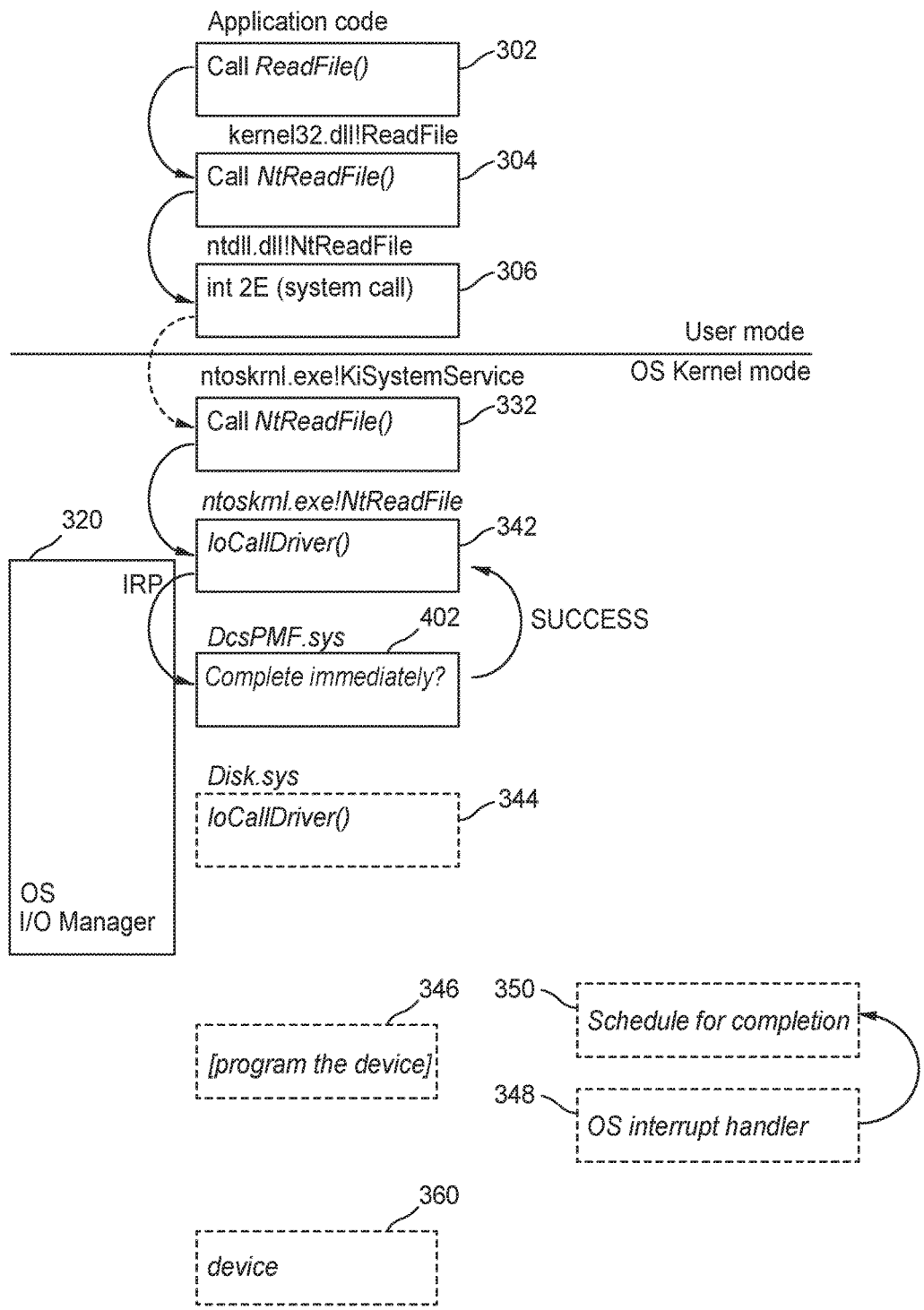
FIG. 4 is a block and flow diagram illustrating an example of storage virtualization with adaptive parallel IO in connection with an IO request subject to immediate processing.

FIG. 4 is a block and flow diagram illustrating an example of the operation of an SV component having an APIO component, in connection with a read operation (cache hit).

The APIO component processes IO requests in a highly parallel fashion, preserving context as much as possible. In bypassing the OS IO sequencing component, the APIO component typically completes data requests in microseconds with very high probability, on the same CPU and in the same context as the application thread issuing the data request. FIG. 4 illustrates the integration of the component in a typical operating system environment, and how it accommodates realization of the full parallel potential of a multicore server platform.

FIG. 4 illustrates a sequence of calls from an application to execute a read request against a disk, under storage virtualization having an adaptive parallel IO component. An application initiates an IO request, here a read request (302). An application thread executing application code transfers to the Win32 API ReadFile (304). The application thread transfers to another Windows API, NtReadFile, where it executes a system trap instruction (306).

The application thread then switches to kernel mode, so that it can execute in the trusted areas of the operating system normally off-limits to running applications. The trap handler sends the application thread to another NtReadFile in the kernel (332). This initiates involvement of the Windows I/O Manager 320. In NtReadFile, the app thread builds an I/O Request Packet (IRP), sets it up to target a disk object, and then carries it into the I/O manager (342).

An upper filter driver of the APIO component that is registered with I/O Manager 320 is the first to see the IO request. It passes the request to the storage virtualization component for a determination whether it can be completed immediately (402). For example, with high probability, the requested data already resides in a high-speed cache, called a cache read hit (assumed present in FIG. 4). In this scenario, the SV component handles the IO request immediately. This takes place typically within microseconds of processing time. The filter driver then returns the requested data to the application immediately with "SUCCESS", synchronously, without invoking any of the underlying drivers; without waiting for, acquiring, and programming the device; without invoking any of the interrupt signaling or handling associated with the device completing a request. The original application thread context is preserved, the CPU cache state is preserved, and no other CPUs are disturbed. Contention for the device and contention associated with the device's interrupt is avoided altogether.

With the bypassing of the IO scheduling components of the OS, there is an immediate and substantial introduction of efficiency. Also, the efficiencies of avoiding contention among "upward" and "downward" bound storage-related threads are multiplied in a multicore environment. At the same time, it is useful for the storage virtualization component to be equipped for a parallel processing environment, so that the storage virtualization component does not itself introduced serialization on the IO request processing code path.

Figure 6:
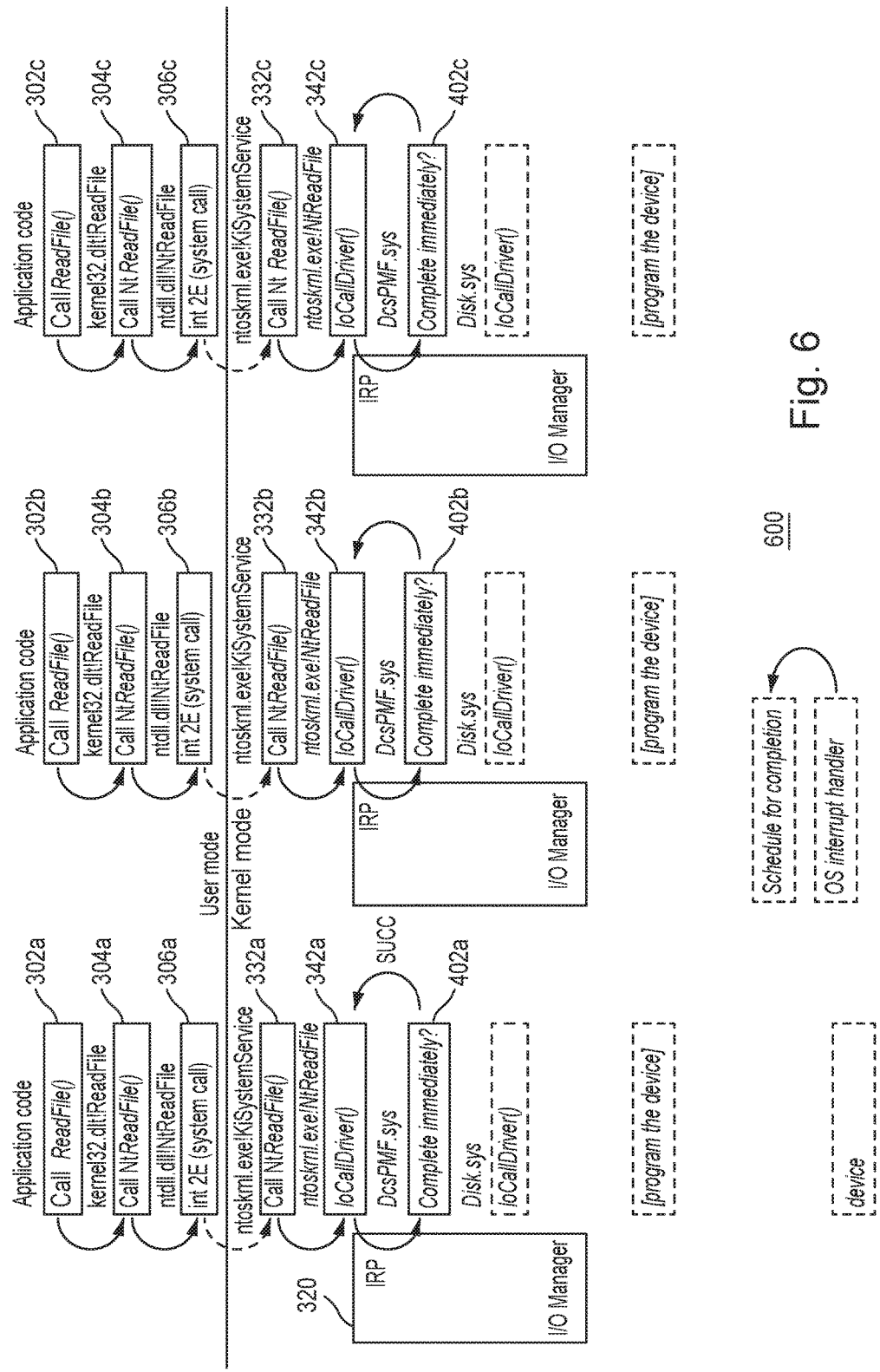
FIG. 6 is a block diagram illustrating storage virtualization with adaptive parallel IO in a parallel/multi-core environment.

FIG. 6 is a block diagram illustrating storage virtualization with adaptive parallel IO in a parallel/multicore environment.

The initiation of application threads for IO requests (302a-c), transfer to the OS (304a-c), execution of the system trap instruction (306a-c) and switchover to kernel mode (332a-c) all occur in parallel. Although three parallel instances are shown, there can be many more parallel threads in a typical multicore environment.

When multiple application threads are issuing requests simultaneously, the filter driver (342a-c) and storage virtualization component (402a-c) cooperate to keep each thread's request local to the CPU on which it is running. With high probability, the request is completed immediately in the application context. Contention for shared objects is eliminated, and CPU state and pipeline throughput is preserved. The result is a highly parallel execution model, taking full advantage of the multicore processing platform's potential.

Figure 5:
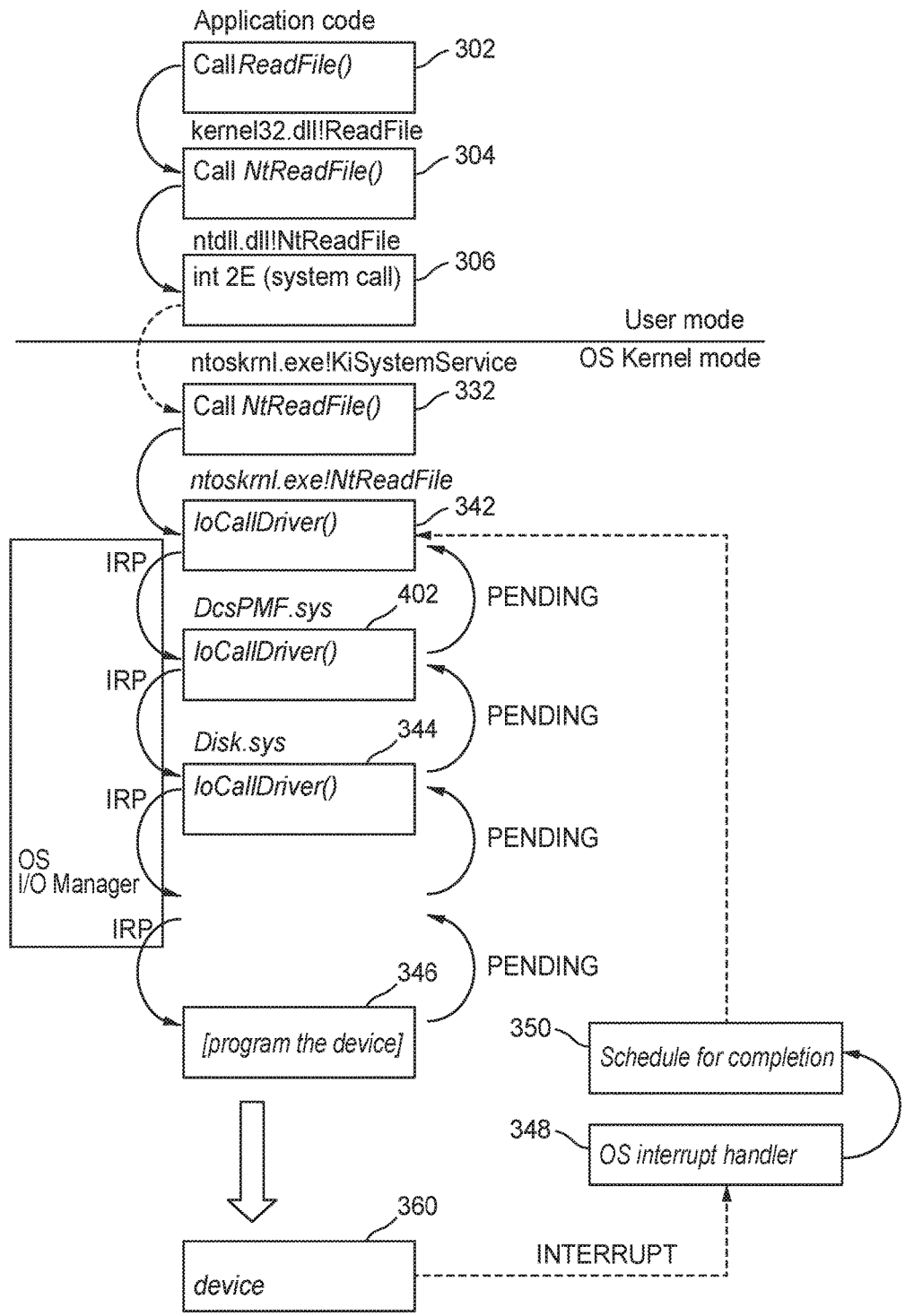
FIG. 5 is a block and flow diagram illustrating an example of storage virtualization with adaptive parallel IO in connection with an IO request not subject to immediate processing.

FIG. 5 is a block and flow diagram illustrating an example of storage virtualization with adaptive parallel IO in connection with another read operation (cache miss). The various modules in FIG. 5 correspond to those described for FIGS. 3-4 and need not be repeated. The notable aspects of the cache miss situation are that when the filter driver and storage virtualization component cannot satisfy the read request, then it will default to the existing OS I/O processing code path. This "re-introduces" the same delays that would be encountered in a conventional approach, but the cache miss situation is relatively rare. Moreover, when the storage virtualization component ultimately satisfies the read request, it brings the data thus read into its high-speed cache, so that a subsequent read request for that data will hit in cache.

Figure 7:
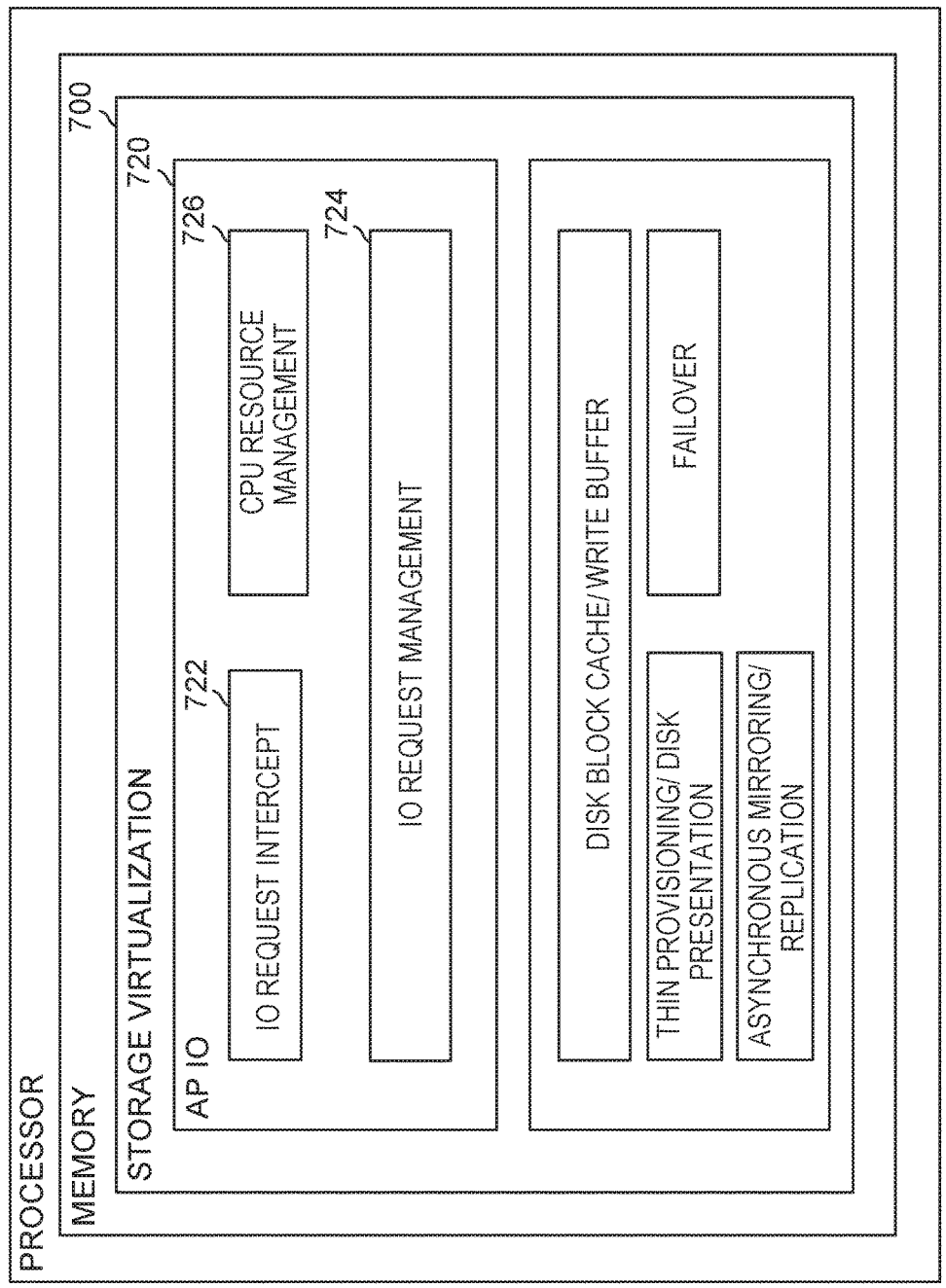
FIG. 7 is a block diagram illustrating an example of storage virtualization with an adaptive parallel I0 component.

FIG. 7 is a block diagram illustrating an example of an SV component 700 including an APIO component 720.

The SV component 700 includes a variety of components that are available in storage virtualization including thin provisioning/disk presentation, asynchronous mirroring, failover/failback and asynchronous replication. The SV component 700 also preferably includes a disk block cache. This is a block level cache the stores data typically read from disks presented by the SV component 700, and is ideally provided in high speed memory for immediate access in response to IO requests. The disk block cache is updated based upon criteria including how recently the data for a given block has been read. When the SV component 700 receives a read request, it can either direct the read request from the cache (cache hit), or organize retrieval of the data when it's not resident in the cache (cache miss). The SV component 700 also handles write requests and preferably includes buffering so the incoming writes can be queued and thus immediately indicated as successfully received (e.g., in response to an incoming application thread with a write request). Various schemes may be used to maintain data coherency in organizing the queuing of writes and their ultimate resolution into the disk block cache and/or external storage resources.

The APIO component 720 includes an IO request intercept component 722, an IO request management component 724, and a CPU resource management component 726.

The IO request intercept component 722 includes the upper level driver that intercepts the IO requests before they progress through the above-described typical OS IO sequencing events.

The IO request management component 724 is in communication with the IO request intercept component 722. It determines whether a corresponding IO request is immediately serviceable by the SV component 700. In one example, a read request that results in a cache hit is an example of an immediately serviceable IO request. This may be performed through inquiry to the SV component 700 with respect to the state of the disk block cache. A write request is another example of an immediately serviceable IO request. This, however, may be subject to the current capacity of the disk block cache, and where applicable its corresponding write buffer. With respect to this, the disk block cache of the SV component 700 is configured to immediately indicate whether it can currently accept the write request. The IO request management component 724 receives the indication and processes the IO request accordingly, with "success" corresponding to the ability to immediately satisfy the IO request so as to omit normal OS IO scheduling.

The reads or writes that are immediately serviceable are handled as such, and the APIO component 720 passes the success of the IO request back up to the application immediately and without context switching. When the IO request is not immediately serviceable, the APIO component 720 provides instructions to pass the thread with the IO request back for regular IO scheduling.

The CPU resource management component 726 allows adaptive usage of multi-core processing platform (e.g., more CPUs). Traditional IO scheduling doesn't make use of spare CPU resources on demand. By contrast, the APIO 720 effectively invokes available CPU resources (i.e., available additional CPUs of the multicore platform on which it operates). But the ability to adaptively invoke available CPUs creates a tension between CPU resources to be used for application workload and those used for IO demand.

The CPU resource management component 726 is configured to make determinations as to whether IO requests can directly proceed (without invoking normal OS IO scheduling) using potentially available CPU resources. In one example, the determination is based upon a designated maximum number of CPUs that can be dedicated to IO demand. Thus, if an IO request arrives and there are remaining, available CPUs, and the maximum number is not reached, the CPU resource management component 726 informs the IO request management component 724 that the IO request is serviceable. This results in an indication of "success" for the IO request that is communicated back to the application as described.

It is important to note that in one embodiment, the indication that an IO request can be successfully handled can be made regardless of the state of the disk block cache. That is, even on a cache miss, or a situation where write buffer capacity is reached, the CPU resource management component 726 can inquire and inform as to currently available CPU resources for immediately processing the IO request. In this fashion, available CPU resources are used to pick up and satisfy the IO request as expeditiously as possible, instead of passing the IO request back up the chain for normal OS 10 scheduling.

The CPU resource management component 726 may also use alternative or additional criteria to determination whether CPU resources can be used to handle IO requests. The CPU resource management component 726 is preferably configured to dynamically balance the availability of CPU resources between application demand and IO demand. It is configured to track instantaneous and historical IO and application processing loads, and to use that information to determine whether an available CPU resource may be allocated to an IO request. For example, historical information may show that the demand for application processing demand increases during a particular time period (e.g., 10 AM-2 PM). It may also show that demand for IO request processing increases during another particular time period (e.g., 8 AM-10 AM and/or 4 PM-6 PM). Either or both of these denoted time periods may be used to determine CPU resource allocation. In one embodiment, this information may be used to adjust the setting of the designated maximum number of CPUs that can be dedicated to IO demand. Thus, during the time period(s) where application processing is historically heavy, the threshold value (setting) for the maximum number of CPUs useable for IO demand decreases, whereas during th time period(s) where IO request processing is historically heavy, the threshold value increases. Still further, instantaneous demand levels are analyzed to further modify the decision making process. This can be embodied as additional adjustments to the maximum number of CPUs available for IO demand depending upon ongoing needs (TO v. applications) in real time.

In one example, the CPU resource management component 726 is also configured to apply Quality of Service (QOS) criteria to determinations whether IO requests can be immediately processed. For example, IO requests originating from a first set of applications may be given priority over those of other applications based upon a QOS guarantee provided to the first set of applications. For example, the QOS can be delineated among levels (e.g., levels 1-3) with a given first level being designated for highest priority, and so on. In one example, the threshold values for the number of CPUs available for IO request processing differs among the respective levels (e.g., level 3 maximum 20% of CPU resources, level 2 at 35% and level 1 at 50%). Moreover, these levels are configurable to similarly adjust depending upon historical and instantaneous demand levels, as described above.

In one embodiment, the CPU resource management component 726 is configured to apply all of the above described criteria to carry out determinations whether IO requests can be immediately processed using CPU resources on the multicore platform. This is preferably carried out using a set of rules or heuristics corresponding to the number of CPU resources and corresponding default thresholds, QOS criteria, and historical and instantaneous load values. Moreover, the settings for the determinations are configurable to accommodate customized allocation of CPU resources.

The SV component 700 including the APIO component 720 may be provided as software, such as resident in memory for execution by a processing unit as part of a processing system. It may also be provided as stored on a non-transitory computer readable medium (e.g., a disk) for downloading, uploading, selling, distributing, etc. of the SV component 700 with the APIO component 720.

Thus, methods and apparatus for performing parallel IO operations are provided in accordance with the present invention. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for handling Input/Output (I/O) requests directed to an operating system having an IO scheduling component, the method comprising:
intercepting an IO request directed from an application to the operating system;
determining whether the IO request is subject to immediate processing using available parallel processing resources; and
bypassing the IO scheduling component of the operating system when it is determined that the IO request is subject to immediate processing using the available parallel processing resources,
wherein said determining whether the IO request is subject to immediate processing comprises
querying a disk block cache status, and
determining that the IO request is subject to immediate processing where the disk block cache status query indicates availability to immediately process the IO request.

2. The method of claim 1, wherein the availability to immediately process the IO request comprises a cache hit status where the IO request is a read request.

3. The method of claim 1, wherein the availability to immediately process the IO request comprises an indication of write buffer availability where the IO request is a write request.

4. The method of claim 1, wherein said determining whether the IO request is subject to immediate processing further comprises an adaptive determination of the available parallel processing resources.

5. The method of claim 1, further comprising:
identifying a quality of service promised to the application originating the IO request; and
determining that the IO request is subject to immediate processing depending upon the quality of service promised to the application.

6. The method of claim 1, further comprising:
determining historical demand information corresponding to IO request processing and application task processing; and
determining that the IO request is subject to immediate processing depending upon the historical demand information.

7. The method of claim 6, further comprising:
determining instantaneous demand information; and
adjusting criteria for determining that the IO request is subject to immediate processing based upon the instantaneous demand information.

8. The method of claim 1, further comprising:
determining that the IO request is subject to immediate processing depending upon at least one of a threshold number of processors for IO request processing, a quality of service promised to the application originating the IO request, or a demand level corresponding to IO request processing.

9. A method for handling Input/Output (I/O) requests directed to an operating system having an IO scheduling component, the method comprising:
intercepting an IO request directed from an application to the operating system;
determining whether the IO request is subject to immediate processing using available parallel processing resources;
bypassing the IO scheduling component of the operating system when it is determined that the IO request is subject to immediate processing using the available parallel processing resources;
determining a threshold number of processors for IO request processing; and
determining that the IO request is subject to immediate processing where a currently used number of processors for IO processing is below the threshold number.

10. A non-transitory computer readable medium storing program code for handling Input/Output (I/O) requests directed to an operating system having an IO scheduling component, the program code being executable by a processor to perform operations comprising:
 intercepting an IO request directed from an application to the operating system;
 determining whether the IO request is subject to immediate processing using available parallel processing resources; and
 bypassing the IO scheduling component of the operating system when it is determined that the IO request is subject to immediate processing using the available parallel processing resources,
 wherein determining whether the IO request is subject to immediate processing comprises
 querying a disk block cache status, and
 determining that the IO request is subject to immediate processing where the disk block cache status query indicates availability to immediately process the IO request.

11. The computer readable medium of claim 10, wherein the availability to immediately process the IO request comprises a cache hit status where the IO request is a read request.

12. The computer readable medium of claim 10, wherein the availability to immediately process the IO request comprises an indication of write buffer availability where the IO request is a write request.

13. The computer readable medium of claim 10, wherein said determining whether the IO request is subject to immediate processing further comprises an adaptive determination of the available parallel processing resources.

14. The computer readable medium of claim 10, wherein the operations further comprise:
 identifying a quality of service promised to the application originating the IO request; and
 determining that the IO request is subject to immediate processing depending upon the quality of service promised to the application.

15. The computer readable medium of claim 10, wherein the operations further comprise:
 determining historical demand information corresponding to IO request processing and application task processing; and
 determining that the IO request is subject to immediate processing depending upon the historical demand information.

16. The computer readable medium of claim 15, wherein the operations further comprise:
 determining instantaneous demand information; and
 adjusting criteria for determining that the IO request is subject to immediate processing based upon the instantaneous demand information.

17. The computer readable medium of claim 10, wherein the operations further comprise:
 determining that the IO request is subject to immediate processing depending upon at least one of a threshold number of processors for IO request processing, a quality of service promised to the application originating the IO request, or a demand level corresponding to IO request processing.

18. A non-transitory computer readable medium storing program code for handling Input/Output (I/O) requests directed to an operating system having an IO scheduling component, the program code being executable by a processor to perform operations comprising:
 intercepting an IO request directed from an application to the operating system;
 determining whether the IO request is subject to immediate processing using available parallel processing resources;
 bypassing the IO scheduling component of the operating system when it is determined that the IO request is subject to immediate processing using the available parallel processing resources;
 determining a threshold number of processors for IO request processing; and
 determining that the IO request is subject to immediate processing where a currently used number of processors for IO processing is below the threshold number.

* * * * *